United States Patent [19]

Kujas

[11] Patent Number: 4,460,660

[45] Date of Patent: Jul. 17, 1984

[54] NEGATIVE HYDROGEN ELECTRODE COMPRISING AN ALLOY PALLADIUM AND RUTHERIUM

[75] Inventor: Erich F. Kujas, Vincentown, N.J.

[73] Assignee: RCA Corporation, New York, N.Y.

[21] Appl. No.: 452,116

[22] Filed: Dec. 22, 1982

[51] Int. Cl.$^3$ .............................................. H01M 4/92
[52] U.S. Cl. ...................................... 429/40; 429/42; 429/44; 502/339
[58] Field of Search ...................... 429/40, 42, 44, 27; 252/472, 444

[56] References Cited

U.S. PATENT DOCUMENTS

| | | | |
|---|---|---|---|
| 3,291,753 | 12/1966 | Thompson | 429/40 X |
| 3,340,097 | 9/1967 | Hess et al. | 136/120 |
| 3,438,815 | 4/1969 | Giner | 429/44 X |
| 3,457,113 | 7/1969 | Deibert | 429/44 |
| 3,506,494 | 4/1970 | Adlhart | 136/86 |
| 4,039,409 | 8/1977 | LaConti et al. | 204/129 |
| 4,163,084 | 7/1979 | Tsai et al. | 429/206 |
| 4,202,934 | 5/1980 | Jalan | 429/40 |
| 4,234,554 | 11/1980 | Rabenau et al. | 423/409 |
| 4,380,576 | 4/1983 | Yoshida et al. | 429/43 X |

*Primary Examiner*—Anthony Skapars
*Attorney, Agent, or Firm*—Birgit E. Morris; R. Hain Swope

[57] ABSTRACT

An improved electrode useful in nickel-hydrogen fuel cells is disclosed. The electrode is comprised of an alloy of equal quantities of palladium and ruthenium on a suitable support material.

4 Claims, No Drawings

NEGATIVE HYDROGEN ELECTRODE COMPRISING AN ALLOY PALLADIUM AND RUTHERIUM

This invention relates to an improved electrode which functions, for example, as the negative or catalytic electrode in a nickel-hydrogen cell.

BACKGROUND OF THE INVENTION

Fuel cells, i.e. devices which convert the energy of a chemical reaction directly into low voltage direct current (DC) electricity, are well known. Such devices have become increasingly important as the exploration and utilization of space has grown.

The conditions under which a power cell must function in space are especially rigorous. Typically, a satellite or space vehicle depends on solar cells for power and operates on batteries only when shielded from the sun. The power cells, which are recharged by the solar cells, must therefore go through continuous cycles of charge and discharge in addition to precipitous changes in temperature. The time intervals for the charge and discharge phases of the cycle are rarely equal and depend on the orbit, the speed of the craft and other factors.

In addition to being able to withstand the rigors of rapidly changing conditions in orbit, a power cell must meet exacting criteria in weight, size, efficiency, power, cost and the like to qualify for use in space. It is further important that a power cell be able to function at low temperature and under low pressure. Because there is no back-up system for the power cells on a space craft, they are of critical importance since a premature power breakdown results in a loss of an investment well in the millions of dollars.

In a nickel-hydrogen fuel cell, a nickel electrode is the anode and the cathode is a conventional gas generating structure. In operation, free hydrogen, generated in the cell during charging, functions as the cathode. The reaction for charge/discharge of such a cell is

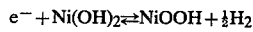

The electrolyte in such a cell is preferably an aqueous solution of a strong base, such as potassium hydroxide.

It is evident that, in such a cell, the hydrogen can only be converted into electrical power by means of the catalyst in the catalytic electrode. It follows that the efficiency and durability of the catalyst is frequently the determining factor of the useful life of such a fuel cell. Conventionally, the catalyst in such electrodes is generally an alloy of two or more metals including at least one noble metal such as platinum, ruthenium, nobium or the like. It is known that, in such cells, these catalyst materials can be poisoned by coming in contact with, e.g. copper in the electrolyte, or nickel which has broken away from the anode. Another hazard to the catalyst electrode in a nickel/hydrogen fuel cell is overconcentration of the electrolyte at higher polarization which results in electrolyte salt crystal formation on the catalyst surface. Any of these phenomena will significantly decrease the potential of the cell resulting in loss of operating efficiency for the vehicle containing it.

In the literature pertaining to nickel-hydrogen fuel cells, palladium is not included among the noble metals suggested as catalytic materials. There are several reasons for this. Palladium is very sensitive to the above-mentioned phenomena, particularly poisoning by copper. A pure palladium catalyst can be poisoned by amounts of copper measurable in angstroms. In addition, a pure palladium catalyst would be particularly unsuited for a nickel-hydrogen fuel cell because, under standard conditions in such cells, it will absorb up to 800 times its own volume of hydrogen. Further, pure palladium has shown a tendency to release from the support material during operation of test cells.

In accordance with this invention, it has been found that palladium alloyed with ruthenium is unexpectedly substantially improved in tolerance to all of the aforementioned phenomena. In addition, the palladium/ruthenium electrodes provided in accordance with this invention are superior in operating efficiency to electrodes combining alloys of ruthenium with other noble metals such as platinum.

SUMMARY OF THE INVENTION

In accordance with this invention, there are provided improved catalytic electrodes comprising equal quantities of palladium and ruthenium on a suitable support. The subject electrodes are particularly useful in nickel-hydrogen fuel cells.

DETAILED DESCRIPTION OF THE INVENTION

The electrodes of this invention are formed on a conventional support, preferably a nickel support, e.g. a mesh, wire or screen. The support can be of any size and configuration necessary for the dimensions of the fuel cell containing it.

A dispersion of polytetrafluoroethylene, hereinafter PTFE, having about 60 percent by weight solids content is admixed with from about 40 percent to about 55 percent, preferably about 50 percent by weight, based on the weight of the dispersion, of activated carbon. Once a uniform dispersion is achieved, it is pressed into the nickel support and baked at about 135° C. for 2 hours to remove the water. The high solids content of the PTFE in the dispersion results in substantially complete encapsulation of the carbon particles. The presence of PTFE substantially increases the mechanical strength of the structure and renders the carbon nonwetting. It is critical that the carbon be nonwetting because, were it not so, the potassium hydroxide or other strong salt from the electrolyte would fill up the pores and interfere with deposition of the catalyst.

The use of baked, porous carbon as a support for a catalytic electrode is known. For example, U.S. Pat. No. 3,506,494 discloses such supports for a catalyst of platinum and tin. However, in such supports, there is the tendency for the carbon to at least partially encapsulate the catalyst and thus inhibit its usefulness. The methods of forming the electrode of this invention deposits the catalyst on the surface of the carbon. This results in significantly increased activity.

The support structure is provided with the subject catalyst materials by one of two methods. In the first, palladium and ruthenium, as their chlorides, are dissolved in sufficient isopropyl alcohol to produce a solution. Generally, the solution contains about 10 percent by weight of each salt. The support material is immersed in the solution under vacuum for about five minutes, drained and then dried in an oven at about 85° C. for about four hours. It is preferred to immerse the support in the solution under vacuum because a complete and uniform distribution of the catalyst is achieved. The structure is then heated in a hydrogen atmosphere to about 800° C. to reduce the salts to the free metals and form an impregnate of palladium-ruthenium alloy.

The formation of an elemental metal impregnate by the chemical or electrical reduction of salts such as the chloride is disclosed, for example, in U.S. Pat. No. 3,340,097. Heating the dry support to high temperature in a hydrogen atmosphere in accordance with this invention is advantageous thereover in that the high temperature drives off impurities present in the salts, thus producing a much purer alloy with higher operating efficiency. The heat also has a tendency to drive the alloy into the pores of the surface carbon particles thus producing greater penetration than known methods.

Alternatively, the palladium/ruthenium alloy may be formed on the subject electrode by electrodeposition utilizing conventional apparatus. The electrodeposition solution is an aqueous solution of the two metals in the form of their nitrate salts. The solution preferably contains about 10 percent by weight of each metal salt and has a specific gravity of about 1.60. The plating current density is generally about 100 mA/cm$^2$. The electrodeposition is preferably carried out over a period of from about 20 to about 25 minutes, after which the support is withdrawn from the solution, dried at about 95° C. for 2 hours, brushed and weighed to determine catalyst pickup. The procedure can be repeated, if necessary, to deposit the desired amount of catalyst on the support. This method is effective in increasing the cohesion of the subject catalyst within the pores, i.e. the density to which the surface pores of the carbon particles are packed with catalyst alloy. The method forces more material into the pores than previously known methods because it can be repeated until the desired catalyst deposition has been achieved. For this reason, the electrodeposition method is preferred for the higher percent catalyst depositions over the chemical method which cannot be repeated once the high temperature heating has been carried out.

Regardless of the method of deposition utilized, the amount of catalyst alloy added to the support comprises from about 4 to about 20 percent by weight, preferably from about 5 to about 10 percent by weight, based on the total weight of the support. The two methods of deposition differ only in that the electrodeposition method puts more alloy on the support surface, whereas the chemical reduction method causes impregnation of the surface carbon particles. The catalytic electrode produced by either method is equally effective.

The subject electrodes contain palladium and ruthenium in equal quantities by weight. The term "equal" as utilized herein connotes a variation of the two metals within one or two percent. Variation substantially beyond that, e.g. 55:45 mixtures, results in a rapid loss of operating efficiency. The optimum weight ratio, therefore, is 50:50.

The subject catalytic electrodes are more efficient, more durable and less costly than conventional electrodes. For example, an electrode in accordance with this invention costs less than half that of a conventional platinum electrode. Although the electrodes of this invention may be used for other applications such as electroforming reactions, they are primarily useful in nickel-hydrogen fuel cells. Nickel-hydrogen fuel cells containing the electrodes of this invention operate at a much higher potential than fuel cells containing conventional platinum electrodes. The subject electrodes also operate at lower pressure than conventional electrodes, a decided advantage for use in a satellite or similar vehicle.

The following Examples further illustrate this invention, it being understood that the invention is in no way intended to be limited to the details described therein. In the Examples, all parts and percentages are on a weight basis and all temperatures are in degrees Celsius, unless otherwise stated.

Example 1

To 60 grams of a commercial dispersion of polytetrafluoroethylene containing 60 percent solids was added 40 grams of activated carbon with stirring. When all of the carbon had been taken up, the dispersion was pressed into 60 nickel mesh supports which measured 5×5 cm. The supports were baked in an oven at 120° for 2 hours. The dry supports were removed from the oven and allowed to cool to ambient temperature.

Ten gram quantities of palladium chloride and ruthenium chloride were dissolved in 100 ml of isopropyl alcohol. The solution was placed in a vacuum chamber which was evacuated to a pressure of 25 mtorr. Thirty supports were immersed into the solution under the vacuum and held there for five minutes. The supports were removed, allowed to drain and then placed in a conventional oven for four hours at 150°. The dry supports were then placed into a furnace and heated to 800° under a hydrogen atmosphere for 30 minutes.

The completed electrodes, upon drying, were found to have gained an average of ten percent by weight of the palladium/ruthenium alloy.

Example 2

The remainder of the supports prepared in Example 1 were placed into a conventional electrodeposition apparatus and connected as the anode. A solution prepared by dissolving 10 grams each of palladium nitrate and ruthenium nitrate in 100 ml of distilled water was charged to the apparatus. The aqueous solution had a specific gravity of 1.60. A current density of 100 mA/cm$_2$ was passed through the apparatus for 20 minutes. The electrodes were removed, allowed to drain, and then dried in an oven at 75° for 60 minutes. The electrodes were brushed with an emery cloth and weighed. The electrodes were found to have gained 12 percent by weight of the catalytic materials based on the initial weight of the support before electrodeposition.

Comparative Example

Samples of electrodes prepared according to Examples 1 and 2 were tested in a standard nickel-hydrogen cell against conventional electrodes containing an equal amount of platinum. In each instance, a current density of 100 mA/cm$_2$ was applied to the cell at 25° and an operating pressure of 600 p.s.i. A high impedance voltmeter was used to measure the anode potential. The results are given in the following table. In the table, Catalyst A is a mixture of equal quantities of palladium and ruthenium prepared by either Example 1 or 2 and Catalyst B is pure platinum. The anode potential is given in millivolts.

TABLE

| Catalyst | Percent | Anode Potential |
| --- | --- | --- |
| A | 8 | 550 |
| B | 8 | 120 |

TABLE-continued

| Catalyst | Percent | Anode Potential |
|---|---|---|
| A | 10 | 730 |
| B | 10 | 160 |
| A | 12 | 750 |
| B | 12 | 210 |
| A | 14 | 830 |
| B | 14 | 230 |
| A | 16 | 850 |
| B | 16 | 270 |
| A | 18 | 910 |
| B | 18 | 300 |
| A | 20 | 950 |
| B | 20 | 340 |
| A | 22 | 690 |
| B | 22 | 320 |

The superiority of the electrodes of this invention in comparison to the conventional platinum electrode is clearly evident from the above data. It is apparent from this experiment that increasing the catalyst content above about twenty percent in either instance has a negative effect on efficiency.

I claim:

1. An electrode suitable for use in a nickel-hydrogen fuel cell comprising a support structure having thereon an alloy consisting of equal quantities of palladium and ruthenium.

2. An electrode in accordance with claim 1, wherein the electrode contains from about 4 to about 20 percent by weight of the alloy based on the weight of the support structure.

3. An electrode in accordance with claim 2, wherein the electrode contains from about 5 to about 10 percent by weight of the alloy, based on the weight of the support structure.

4. An electrode in accordance with claim 1, wherein the support structure is a nickel structure having adhered thereto particles of activated carbon in a matrix of polytetrafluoroethylene.

* * * * *